June 7, 1938.  D. F. NEWMAN  2,119,791
APPARATUS FOR PRODUCING SCREEN STRUCTURES
Original Filed Jan. 14, 1931  2 Sheets-Sheet 1
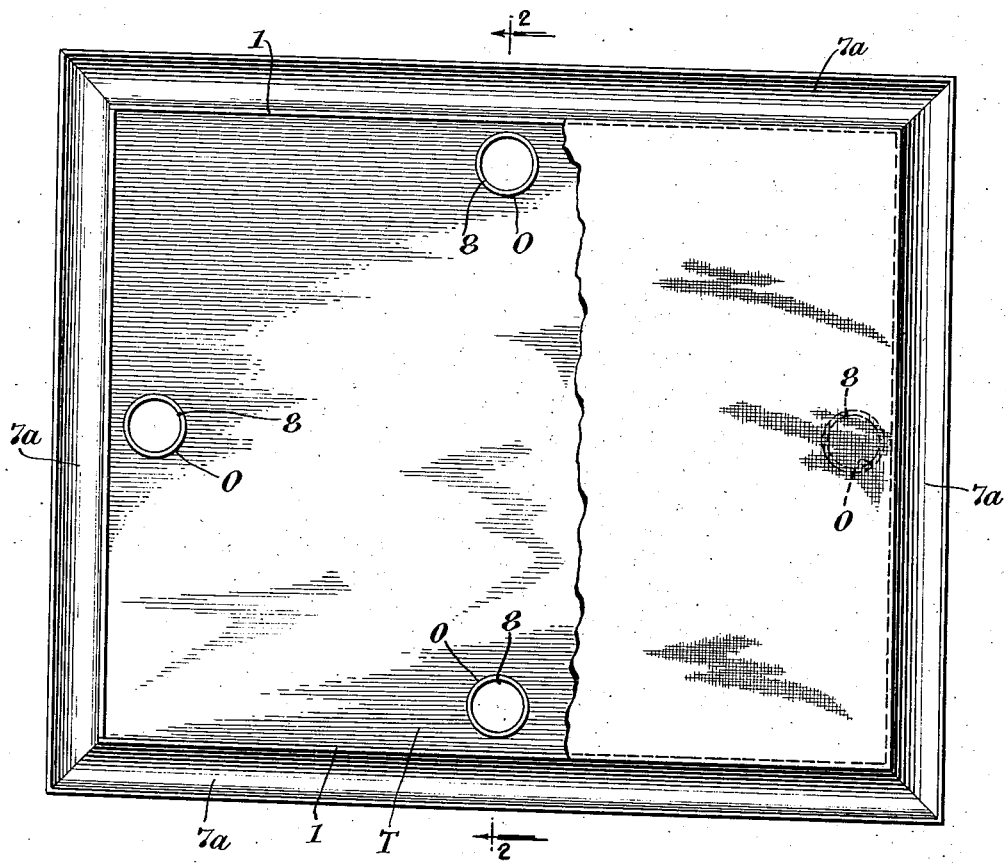
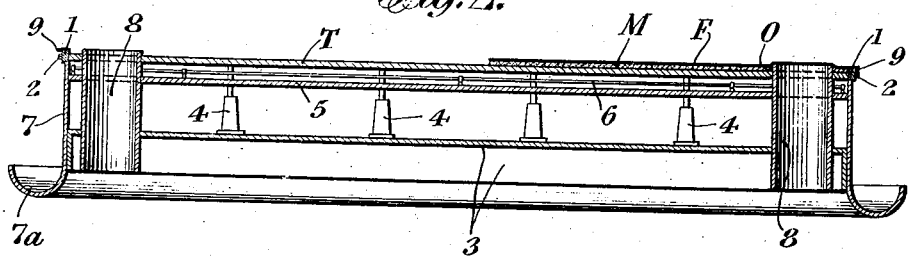
INVENTOR
David F. Newman
BY
Ward, Crosby & Neal
ATTORNEYS

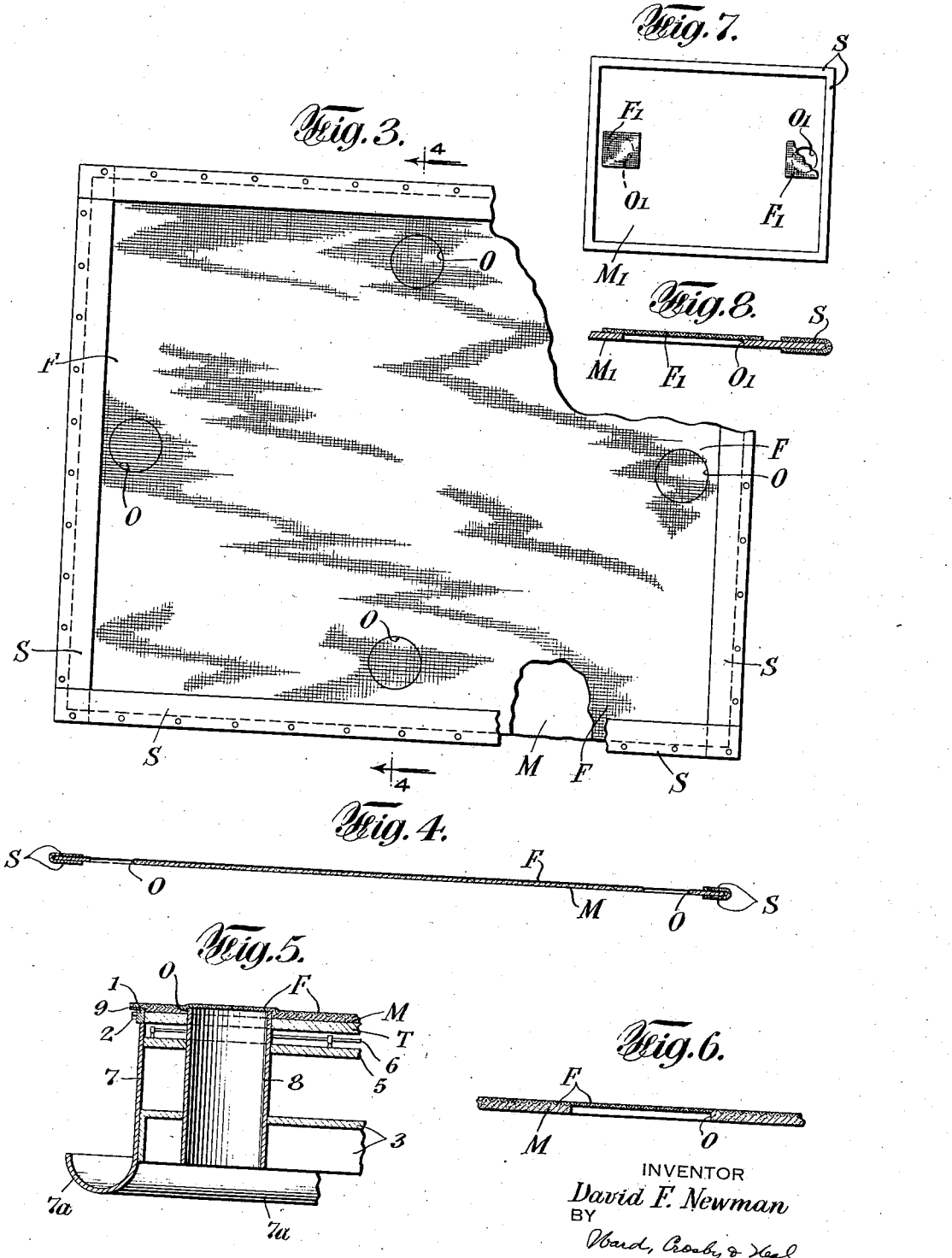

Patented June 7, 1938

2,119,791

UNITED STATES PATENT OFFICE 2,119,791

APPARATUS FOR PRODUCING SCREEN STRUCTURES

David F. Newman, Rockville Centre, N. Y., assignor to Trans-Lux Corporation, a corporation of Delaware Original application January 14, 1931, Serial No. 508,668. Divided and this application September 13, 1934, Serial No. 743,785

1 Claim. (Cl. 18—39)

My invention relates to apparatus for producing a screen structure.

My invention, in one of its prominent phases, relates to apparatus for producing a member, surface or structure utilizable as a screen for the display of motion pictures, stereopticon views, or the like and further utilizable in connection with the reproduction of sound.

Further objects, advantages and characteristics of my invention are apparent from the following detailed description taken in connection with the accompanying drawings.

My invention resides in the apparatus, molding table and features of the character hereinafter described and claimed.

This application is a division of application Serial No. 508,668, filed January 14, 1931.

For an understanding of my invention, reference is to be had to the accompanying drawings, in which:

Figure 1 is a plan view of a screen-forming table having a section of a screen structure thereon;

Fig. 2 is a sectional view, partly in elevation, of the table and screen structure of Fig. 1 and is taken substantially on the line 2—2 of Fig. 1 looking in the direction of the arrows;

Fig. 3 is a plan view, partly broken away, of a screen structure constructed in accordance with my invention;

Fig. 4 is a vertical sectional view of the screen structure of Fig. 3 and is taken substantially on the line 4—4 of Fig. 3 looking in the direction of the arrows;

Fig. 5 is an enlarged, sectional view, partly in elevation, of a part of the table shown in Fig. 2;

Fig. 6 is an enlarged, fragmentary, vertical sectional view of the screen structure shown in Fig. 5;

Fig. 7 is a plan view, partly broken away, of a screen structure of a modified form; and Fig. 8 is an enlarged, fragmentary, vertical sectional view of the screen structure shown in Fig. 7.

In accordance with one phase of my invention, a screen structure disposed between the projector mechanism and the audience is provided with one or more areas or sections through which, from the rear of the screen structure, sound passes much more readily to the audience than if said areas or sections were not provided. Such a screen structure may be formed by a molding operation, the molding table being constructed and arranged so that the sound-passing areas or sections are properly disposed.

When a screen structure is to be formed as last described, the arrangement may be as illustrated in Figs. 1–6 inclusive wherein T represents a table or other surface formed of any suitable material, as metal, glass or the like, the upper table surface being plane, grooved or corrugated as desired. The table T may be of any suitable configuration but ordinarily it is square or rectangular. Bordering the table T and projecting above the upper surface thereof is wall or ledge structure 1 which may be secured to said table T by screws 2 or the like. If desired, each screw 2 may extend through an elongated slot, not shown, a plurality of which may be formed in each section of the aforesaid wall or ledge structure 1 whereby these sections are adjustable as to height with respect to the table T. As hereinafter described, the wall structure 1 serves as a guide determining the thickness of the material which is to be molded into permanent shape on the table T.

The table T may be supported in any suitable manner. As herein shown, there is utilized a base or bed 3 resting upon any suitable supporting structure, not shown. In the example illustrated although not necessarily, the table T is adjustable in height with respect to the base 3. To this end, a plurality of jacks 4 may be carried by said base 3, the adjustable member of each of said jacks coacting with the lower surface of the table T.

Ordinarily, the material to be molded on the table T is of such character that heat is required to complete the molding operation and, if so, a heating arrangement of any suitable character may be utilized. As herein shown, a member or plate 5 is spaced a suitable distance below the table T, said member or plate 5 being formed from suitable electricity-insulating material and carrying on its upper surface one or more lengths of suitable resistance wire 6, as nichrome, which is so arranged as to supply heat substantially in an even manner to the table T.

As shown particularly in Figs. 2 and 5, each side of the otherwise open frame formed by the base 3, plate 5 and table T may be closed by a member 7, the lower surface 7a of which may be a channel or gutter receiving any excess material which is passed over the ledge structure 2.

In accordance with my invention, one or more members or cores 8 projects or project above the table T to substantially the level of the upper surface of the ledge structure 1. These cores 8 are utilized as hereinafter described and as herein shown, they extend downwardly through the table T, the member 5 and the base 3; preferably, however, they are readily slidable with respect to the table T so that adjustment in height of the latter varies the distance to which said cores 8 project above the top table surface.

The member 5, members 7 and cores 8 may be securely retained in their respective intended positions in any manner suitable to one skilled in the art.

In accordance with a preferred form of my invention, the screen-forming material to be molded on the table T may include one or more materials to be utilized as the screen body with which there is preferably associated a light-diffusing agent, a light-filtering agent and an agent having germicidal, bacteriacidal, fungicidal, and/or preservative qualities.

More specifically, gelatine and glycerine (the body), zinc oxide (light-diffusing agent), cobalt oxide (light-filtering agent), sodium fluoride (germicidal, etc. agent), and water, all proportioned in a suitable manner, for example, as disclosed in my prior application Serial No. 358,166, filed April 25, 1929, may be suitably mixed in a thorough manner while applying heat thereto to produce a relatively hot mass of viscous material.

Then, with the table T heated, by energization of the electrical heating elements 6, to a temperature preferably somewhat below that of the viscous material, the latter is suitably poured on or applied to the table T, preferably until it slightly overflows the bordering wall formed by the ledge structure 1. The excess material should now be removed, as by a straight edge applied to the upper surface of the ledge structure 1.

As a result of the pouring and leveling operation just described, a layer of material M of substantially uniform thickness is obtained on the table T and the upper surface of said layer extends flush with the top surfaces of the ledge structure 1 and cores 8. It results, therefore, in accordance with my invention, that the cores 8 define sections, areas or passages 0 in the layer of material M thus deposited on the table T.

At this stage of the operation, suitable fabric-like material should be incorporated in or associated with the layer of viscous material on the table T. Any suitable fabric may thus be utilized such, for example, as a sheet of woven material, georgette crepe, or the like from which the foreign matter, such as gums, resins, etc. has been suitably removed. Previously, the selected sheet of fabric material F (whether formed from a single piece of material or a plurality of pieces suitably secured together) should have been stretched on a frame 9 having an opening of such extent that it fits snugly around the aforesaid ledge structure 1.

After the excess material has been removed as stated above, the sheet of fabric material F is suitably lowered toward and into engagement with the upper surface of the layer of viscous material M while maintaining temperature elevation thereof substantially the same as during the molding operation and avoiding entrapment of air between the fabric sheet and the layer of viscous material. In so doing, the frame 9 comes into position around the bordering wall 1 and thereupon the fabric sheet F sinks into or amalgamates with the layer of viscous material M. Accordingly, as shown particularly in Fig. 5, sections of the sheet of fabric material F overlie the respective cores 8 and, therefore, in each area or section defined by a core 8, the composite screen structure comprises only a section of fabric material F.

At this time, application of heat to the table T resulting from energization of the electrical heating elements 6, or equivalent, should be discontinued and after a suitable cooling period, as two or three hours, has elapsed, a knife should be passed between the bordering wall 1 and the frame 9, and entirely around the latter to sever the fabric sheet F from its frame 9. Thereupon, the layer of material M now having the fabric sheet F intimately united therewith as described may be removed from the table T in any suitable manner.

Thereafter, the edges of the composite screen structure thus produced may be bound by eyeletted canvas strips S or the like adhesively or otherwise suitably secured to marginal edges thereof. These strips S are provided so that the screen structure may be laced in a suitable frame which retains it usually substantially vertically in projecting position before the audience, all as described more particularly in my aforesaid pending application Serial No. 508,668, filed January 14, 1931. Further, as more fully described in said last named application, the areas or sections 0 serve for the passage of sound waves, the section of fabric material F covering each area obstructing the passage of said sound waves only slightly.

The layer of fabric F forming a part of the composite screen structure functions as a reinforcement to prevent or reduce sag of said screen structure when it is subjected to abnormally high temperature or humid conditions. Further, in accordance with my invention, the fabric sheet F, embedded as it is in the screen material, reinforces said material around each of the areas or sections 0 whereby they are caused to retain their circular or other desired shape and the screen structure is prevented from tearing or otherwise departing from its plane configuration in the immediate vicinity of said openings.

The aforesaid areas or section 0 are shown in Figs. 1 and 3 as located in a particular manner. It shall be understood, however, that my invention is not to be limited to any specified number of the areas or sections 0 and it shall also be understood that they may be distributed in any desired manner around the perimeter of the composite screen structure. Thus, if desired, the upper and lower areas or sections 0 shown in Fig. 3 may be omitted in which case but two areas or sections are provided, one along each vertical side of the screen. Or, the arrangement may be such that there may be any other suitable or desired distribution of said areas or sections 0.

It shall be understood that a composite screen structure embodying the features of my invention may be constructed otherwise than as hereinbefore described. Thus on a suitable table adapted to be heated and corresponding generally with the hereinbefore described table T, with the exception that the cores 8 are omitted, screen-forming material embodying the ingredients hereinbefore described, if desired, may be molded to form a sheet-like, non-perforated screen structure which may or may not, as desired, have a sheet of reinforcing fabric associated therewith. Then, either before or after the edges of said screen structure have been bound by canvas strips or the like, sections thereof may be removed to yield the screen structure formed by the layer of material M1 of Figs. 7 and 8, the openings or passages 01 therein being formed because of the removal of said sections of screen-forming material as just stated. Obviously, said openings or passages 01 may be of a desired size and there may be as many of them as is suitable, the location thereof also being selected as desired.

After the aforesaid openings or passages 01 have been formed, each may be covered by a section F1 of suitable fabric such, for example, as hereinbefore described, said fabric sections being adhesively or otherwise suitably secured to the layer of material M1 as shown.

A screen structure of the character just described is highly satisfactory in operation. It includes the sound-passing areas or sections constituted by the openings 01 and the material immediately adjacent these openings is so reinforced by the respective fabric sections F1 that there is no distortion or tearing thereof when the screen structure is suspended in tensioned condition for use.

Ordinarily, screen structures of the character hereinbefore described are intended for rear projection use as disclosed more particularly in my aforesaid application Serial No. 508,668, filed January 14, 1931. They are translucent to a suitable degree and function in a highly satisfactory manner for the intended purpose. Further, as described more particularly in said last named application, the screen structures because formed from the specified materials or their equivalent are largely resistant to the passage of sound waves therethrough. This is important in connection with proper sound reproduction and is a feature clearly distinguishing one phase of my invention from present commercial theatre installations.

The proportions of the ingredients from which the screen structures are formed may depart from those hereinbefore stated if desired and further other ingredients or agents may be used if desired, or some of them may be omitted. Thus, for example, a curing agent may be employed to determine the rapidity with which the screen structure approaches its completed condition all as more particularly described in my aforesaid pending application Serial No. 358,166.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claim to cover all such changes and modifications.

What is claimed as new and desired to be secured by Letters Patent is:

A molding table utilizable for the production of a screen structure, said table comprising means forming a horizontal surface for the reception of viscous material, a wall around said horizontal surface, a core upstanding from said horizontal surface, said core being closely adjacent one side of said table and the area of said surface being many times the area of said core, means disposed below said surface and adjacent said core for heating said surface, the viscous material being disposed on said horizontal surface and around said core to thereby form an apertured screen structure.

DAVID F. NEWMAN.

CERTIFICATE OF CORRECTION.

Patent No. 2,119,791.                                June 7, 1938.

DAVID F. NEWMAN.

It is hereby certified that error appears in the printed specification of the above numbered patent requiring correction as follows: Page 2, second column, line 22, and page 3, first column, line 22, for the serial number "508,668" read 508,669; and page 2, second column, line 42, for the word "section" read sections; and that the said Letters Patent should be read with this correction therein that the same may conform to the record of the case in the Patent Office.

Signed and sealed this 15th day of November, A. D. 1938.

Henry Van Arsdale

Acting Commissioner of Patents.

(Seal)